United States Patent
Dress

(10) Patent No.: US 11,516,143 B2
(45) Date of Patent: Nov. 29, 2022

(54) ROUTING AND CONTROL PROTOCOL FOR HIGH-PERFORMANCE INTERCONNECT FABRICS

(71) Applicant: Lightfleet Corporation, Camas, WA (US)

(72) Inventor: William B. Dress, Camas, WA (US)

(73) Assignee: Lightfleet Corporation, Camas, WA (US)

(*) Notice: Subject to any disclaimer, the term of this patent is extended or adjusted under 35 U.S.C. 154(b) by 3 days.

(21) Appl. No.: 17/248,133

(22) Filed: Jan. 11, 2021

(65) Prior Publication Data

US 2021/0211388 A1 Jul. 8, 2021

Related U.S. Application Data

(63) Continuation of application No. 16/447,844, filed on Jun. 20, 2019, now abandoned, which is a continuation-in-part of application No. PCT/US2019/031052, filed on May 7, 2019, which is a continuation of application No. 15/997,573, filed on Jun. 4, 2018, now abandoned.

(60) Provisional application No. 62/687,785, filed on Jun. 20, 2018.

(51) Int. Cl.
*H04L 47/50* (2022.01)
*H04L 12/44* (2006.01)

(52) U.S. Cl.
CPC .............. *H04L 47/50* (2013.01); *H04L 12/44* (2013.01)

(58) Field of Classification Search
CPC .............. H04L 47/6215; H04L 49/254; H04L 49/3018; H04L 49/3027; H04L 49/251; H04L 49/25; H04L 45/40; H04L 47/50; H04L 12/44; H04L 49/201; H04L 12/2803
See application file for complete search history.

(56) References Cited

U.S. PATENT DOCUMENTS

| | | |
|---|---|---|
| 2004/0001502 A1* | 1/2004 | Garmire .............. H04L 47/2433 370/461 |
| 2015/0180782 A1* | 6/2015 | Rimmer .................. H04L 69/22 370/235 |

(Continued)

*Primary Examiner* — Khaled M Kassim
*Assistant Examiner* — Najeeb Ansari
(74) *Attorney, Agent, or Firm* — Schultz & Associates, P.C.

(57) ABSTRACT

Operating a computer network uses a routing and control protocol, the computer network having an interconnect fabric including routing and control distribution devices and fabric interface devices, each of the routing and control distribution devices and each of the fabric interface devices having a state machine having an input processing unit having parallel input buffers, an output processing unit having parallel output buffers and an arbiter; operating the state machine based on a set of instructions and a table located at the state machine; transferring data from the input processing unit to the output processing unit; choosing a highest priority currently flit occupied parallel input buffer located in the input processing unit for data transmission on a highest priority currently flit occupied channel; and; interrupting the highest currently flit occupied priority channel when one of the parallel input buffers is detected to contain a superseding even higher priority flit.

8 Claims, 7 Drawing Sheets

(56) References Cited

U.S. PATENT DOCUMENTS

2015/0222533 A1\* 8/2015 Birrittella ............... H04L 47/39
                                                      370/392
2018/0191523 A1\* 7/2018 Shah ........................ H04B 3/36

\* cited by examiner

FIG. 1

| CID | Parameters[52] | Reserved[8] |
|---|---|---|
| 63  60 59 | | 8 7  0 |

| FCM | Type[4] | pMap[16] | 0101 | Zeros[24] | 1010 | 00000000 |
|---|---|---|---|---|---|---|
| 63  60 59 | 56 55 | | 40 39 | 36 35 | 12 11 | 8 7  0 |

| PUT | Pr[4] | s | g | Type[4] | Destination[20] | Length[16] | 000000 | 00000000 |
|---|---|---|---|---|---|---|---|---|
| 63  60 59 | 56 | | | 50 49 | | 30 29 | 14 13 | 8 7  0 |

| 1010 | Offset[52] | 00000000 |
|---|---|---|
| 63  60 59 | | 8 7  0 |

| GET | Pr[4] | s | g | Type[4] | Destination[20] | Length[16] | 000000 | 00000000 |
|---|---|---|---|---|---|---|---|---|
| 63 | 60 59 | 56 | 53 | 50 49 | 30 29 | 14 13 | 8 7 | 0 |

460

| 1010 | Address[20] | Other parameters[32] | 00000000 |
|---|---|---|---|
| 63 | 60 59 | 40 39 | 8 7 | 0 |

490

| 1010 | Offset[52] | 00000000 |
|---|---|---|
| 63 | 60 59 | 8 7 | 0 |

| sPUT | Pr[4] | s | g | Type[4] | Destination[10] | Offset[20] | Length[12] | 00000000 |
|---|---|---|---|---|---|---|---|---|
| 63 | 60 59 | 56 | 53 | 50 49 | 40 39 | 20 19 | 8 7 | 0 |

| sGET | Pr[4] | s | g | Type[4] | Destination[10] | Offset[20] | Length[12] | 00000000 |
|---|---|---|---|---|---|---|---|---|
| 63 | 60 59 | 56 | 53 | 50 49 | 40 39 | 20 19 | 8 7 | 0 |

650

| 1010 | Address[10] | Other parameters[42] | 00000000 |
|---|---|---|---|
| 63 | 60 59 | 50 49 | 8 7 | 0 |

| EOP | Type[4] | Sequence[16] | CRC-32 | 00000000 |
|---|---|---|---|---|
| 63 | 60 56 55 | 40 39 | | 8 7 0 |

| INIT | Type[4] | Atm[4] | DDM ID[16] | Parameters[28] | 00000000 |
|---|---|---|---|---|---|
| 63 | 60 59 56 55 | 52 51 | 36 35 | | 8 7 0 |

| | Key Code[56] | | 00000000 |
|---|---|---|---|
| 63 | | | 8 7 0 |

| SUB | Type[4] | Atm[4] | Parameters[44] | 00000000 |
|---|---|---|---|---|
| 63 | 60 59 56 55 | 52 51 | | 8 7 0 |

| | Key Code[56] | | 00000000 |
|---|---|---|---|
| 63 | | | 8 7 0 |

FIG. 10 — 1000: ACK | Type[4] | pMap[16] | Reset Length[16] | Zeros[16] | 00000000
Bits: 63 | 60 59 | 56 55 | 40 39 | 24 23 | 8 7 | 0

FIG. 11 — 1100: CRC | Length[16] | 0000 | CRC-32 | 00000000
Bits: 63 | 60 59 | 44 43 | 40 39 | 8 7 | 0

FIG. 12 — 1200: TCK | Type[4] | s | g | Destination[20] | Parameters[26] | 00000000
Bits: 63 | 60 59 | 56 | 55 | 53 | 34 33 | 8 7 | 0

FIG. 13 — 1300: GEN | Type[4] | Parameters[48] | 00000000
Bits: 63 | 60 59 | 56 55 | 8 7 | 0

| EXT | Type[4] | Parameters[56] | |
|---|---|---|---|
| 63 | 60 59 56 55 | | 8 7  00000000  0 |

| TIME | Time Stamp[52] | |
|---|---|---|
| 63 | 60 59 | 8 7  00000000  0 |

| ERR | Type[8] | Source[20] | Codes[24] | |
|---|---|---|---|---|
| 63 | 60 59 52 51 | 32 31 | | 8 7  00000000  0 |

| PHY | Type[4] | Dev[4] | Source ID[20] | Counter ID[24] | |
|---|---|---|---|---|---|
| 63 | 60 59 56 55 52 51 | | 32 31 | | 8 7  00000000  0 |

ROUTING AND CONTROL PROTOCOL FOR HIGH-PERFORMANCE INTERCONNECT FABRICS

CROSS REFERENCE TO RELATED APPLICATIONS

This application is a continuation of U.S. application Ser. No. 16/447,844 filed on Jun. 20, 2019, which claims the benefit of U.S. Provisional Application No. 62/687,785 filed on Jun. 20, 2018. U.S. application Ser. No. 16/447,844 is a continuation-in-part of PCT/US2019/031052 filed on May 7, 2019, which is a continuation of U.S. application Ser. No. 15/997,573, filed on Jun. 4, 2018. Each of the patent applications identified above is incorporated herein by reference in its entirety to provide continuity of disclosure.

FIELD OF THE INVENTION

The field of the invention includes parallel processors, sometimes called many-core. An example is a conventional parallel processor that splits the execution of a program among multiple processors.

BACKGROUND OF THE INVENTION

A problem with this parallel processing has been that the multiple processors need to be able to seamlessly communicate data and control signals. One unsatisfactory approach is a bus-based interconnect. For example, U.S. Pat. No. 7,376,295 to Lee, et al. describes opto-electronic processors with reconfigurable chip-to-chip optical interconnections. However, such an interconnect approach is not scalable beyond a modest number of processors and/or chips. Therefore, what is required is solution that is scalable and can be used with many processors.

Other disadvantages of this approach have been relatively high cost, and when the scale increases sufficiently excessive bulk and even heat. Therefore, what is also needed is a solution that meets the above-discussed requirements in a more cost-effective, compact, energy efficient manner.

Another approach, in an attempt to solve the above-discussed problems involves routing data techniques such as flow control. For example, U.S. Pat. No. 9,558,143 to Leidel describes interconnect systems and methods using hybrid memory cube links to send packetized data over different endpoints of a data handling device. However, a disadvantage of this approach is that there are performance issues especially with regard to control and latency.

Heretofore, the requirement(s) of seamless communication, economy, compact form factor, energy efficiency while avoiding control and latency issues referred to above have not been fully met. In view of the foregoing, there is a need in the art for a solution that simultaneously solves all of these problems.

SUMMARY OF THE INVENTION

There is a need for the following embodiments of the present disclosure. Of course, the present disclosure is not limited to these embodiments.

Preferred embodiments of the disclosure can include a flit-buffer flow control protocol having a default interrupt mode and a transient switching mode that can be initiated by an arbiter in a state machine. In the default interrupt mode, the arbiter by default selects a highest priority currently flit occupied parallel input buffer for data transfer from an input processing unit to an output processing unit on a currently highest priority channel. In the meantime, superseding even higher priority flits may arrive at one or more of the parallel input buffers. While in the default interrupt mode the arbiter can interrupt the default selected currently highest priority channel when one of the parallel input buffers is detected to contain a superseding even higher priority flit to open a superseding even high priority channel. In a preferred embodiment, upon detection of a sufficiently even higher priority flit in one of a plurality of parallel input buffers the arbiter changes from the default interrupt mode to the transient switching mode to temporarily hold open a sufficiently even higher priority channel. The arbiter includes an interleave mechanism including an encoder to insert a cyclic redundancy code (CRC) into a sufficiently even higher priority EOP flit to hold the sufficiently even higher priority channel open in the transient switching mode until transfer of the sufficiently even higher priority EOP flit is complete. This allows transfer to operate on a temporary basis in a "wormhole" switching mode rather than a "store-and-forward" mode where a complete packet must be received before the CRC check can begin. This important aspect of embodiments of this disclosure provides a significant commercial advantage with regard to seamless control with very low latency especially at larger scale.

These, and other, embodiments of the present disclosure will be better appreciated and understood when considered in conjunction with the following description and the accompanying drawings. It should be understood, however, that the following description, while indicating various embodiments of the present disclosure and numerous specific details thereof, is given for the purpose of illustration and does not imply limitation. Many substitutions, modifications, additions and/or rearrangements may be made within the scope of embodiments of the present disclosure, and embodiments of the present disclosure include all such substitutions, modifications, additions and/or rearrangements.

BRIEF DESCRIPTION OF THE DRAWINGS

In the detailed description of the preferred embodiments presented below, reference is made to the accompanying drawings.

FIG. 1 is a schematic view of a generic form of a control flit.

FIG. 2 is a schematic view of an FCM flow-control flit.

FIG. 3 is a schematic view of a PUT control flit.

FIG. 4 is a schematic view of a GET control flit.

FIG. 5 is a schematic view of a short PUT control flit.

FIG. 6 is a schematic view of a short GET control flit.

FIG. 7 is a schematic view of an EOP tail control flit.

FIG. 8 is a schematic view of an INIT control flit.

FIG. 9 is a schematic view of a SUB control flit having a basic SUB command.

FIG. 10 is a schematic view of an ACK control flit.

FIG. 11 is a schematic view of a CRC control flit.

FIG. 12 is a schematic view of a TOK control flit.

FIG. 13 is a schematic view of a GEN control flit.

FIG. 14 is a schematic view of an EXT control flit.

FIG. 15 is a schematic view of a TIME control flit.

FIG. 16 is a schematic view of an ERR control flit.

FIG. 17 is a schematic view of a PHY control flit.

DETAILED DESCRIPTION OF THE INVENTION

Embodiments presented in the present disclosure and the various features and advantageous details thereof are explained more fully with reference to the nonlimiting embodiments that are illustrated in the accompanying drawings and detailed in the following description. Descriptions of well-known techniques, components and equipment are omitted so as not to unnecessarily obscure the embodiments of the present disclosure in detail. It should be understood, however, that the detailed description and the specific examples are given by way of illustration only and not by way of limitation. Various substitutions, modifications, additions and/or rearrangements within the scope of the underlying inventive concept will become apparent to those skilled in the art from this disclosure.

The disclosure of this application is technically related to co-pending U.S. application Ser. No. 15/997,573, filed Jun. 4, 2018, co-pending PCT/US2019/031052, filed May 7, 2019, co-pending U.S. application Ser. No. 15/262,402, filed Sep. 12, 2016 and PCT/US2016/051229, filed Sep. 12, 2016, the entire contents of all of which are hereby expressly incorporated herein by reference for all purposes.

In general, the context of an embodiment of the present disclosure can include signal and/or data communications networking. The context of an embodiment of the present disclosure can include host to host communications in a data network interconnect fabric.

Figure 18:
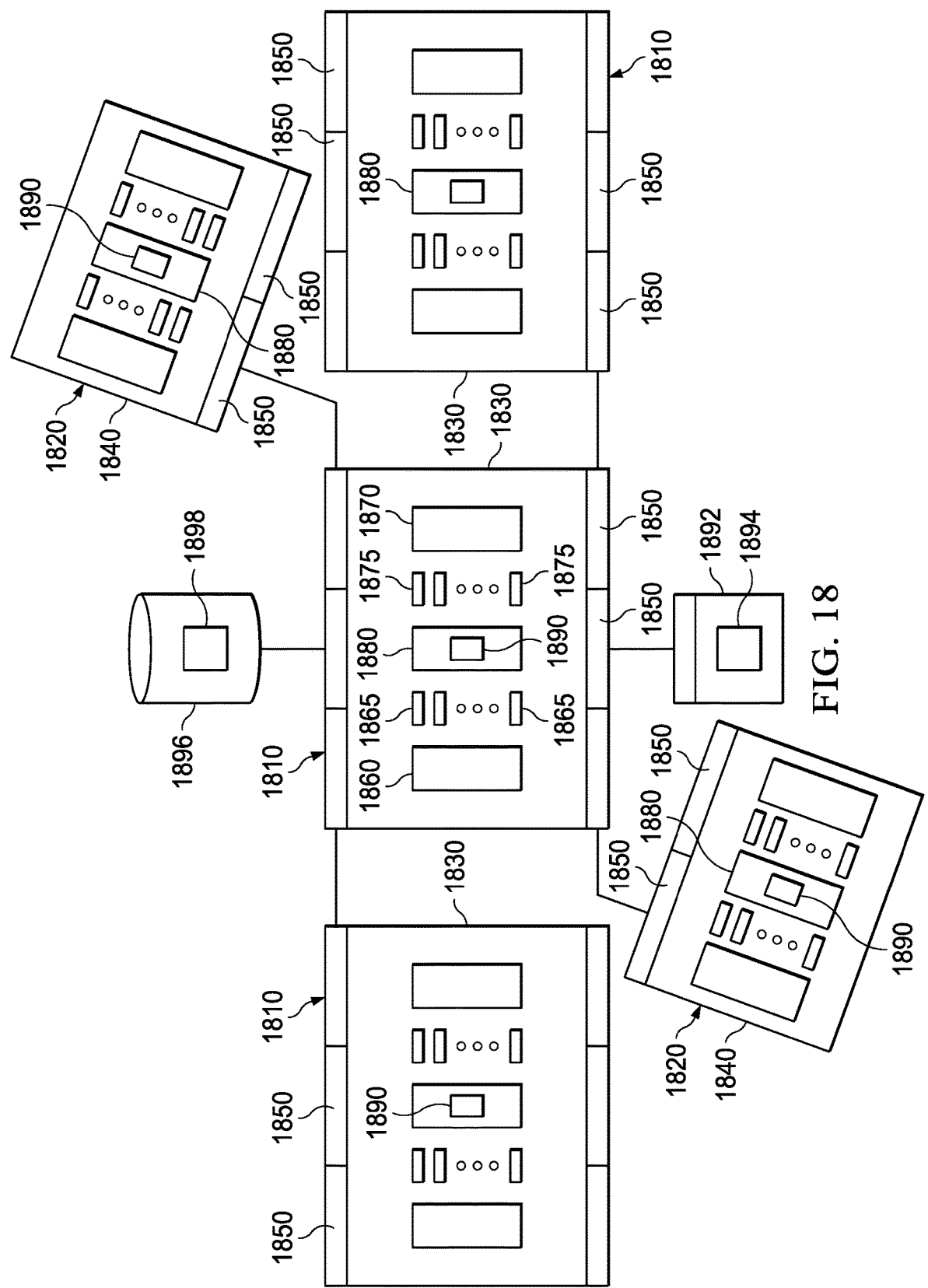
FIG. 18 is a schematic block diagram of a computer network.

FIG. 18 illustrates a block schematic diagram of a computer network. An interconnect fabric includes a plurality of routing and control distribution devices 1810. The network includes a plurality of fabric interface devices 1820 coupled to the plurality of routing and control distribution devices. In this particular embodiment the interconnect fabric is depicted as including three routing and control distribution devices, but the invention is not limited to this number of routing and control distribution devices and the invention can include fewer or more, or many more routing and control distribution devices. Further, in this particular embodiment the network is depicted as including two fabric interface devices, but the invention is not limited to this number of fabric interface devices and the invention can include fewer or more, or many more fabric interface devices.

Each of the plurality of routing and control distribution devices includes a state-machine 1830. Each of the plurality of fabric interface devices also comprises a state-machine 1840. Each of the state machines includes a plurality of bidirectional transceiver ports 1850. Each of the bidirectional transceiver ports includes receiving circuitry and transmitting circuitry.

Each of the state machines also includes an input processing unit 1860 coupled to the plurality of bidirectional transceiver ports. The input processing units include a plurality of parallel input buffers 1865 coupled to the plurality of bidirectional transceiver ports. Each of the plurality of parallel input buffers queues flits of one of a plurality of priority channels.

Each of the state machines also includes an output processing unit 1870 coupled to the plurality of bidirectional transceiver ports. The output processing units include a plurality of parallel output buffers 1875 coupled to the plurality of bidirectional transceiver ports. Each of the plurality of parallel output buffers queues flits of one of the plurality of priority channels.

Each of the state machines includes an arbiter 1880 coupled to the input processing unit and coupled to output processing unit. The arbiter transfers data from the input processing unit to the output processing unit based on a set of instructions and at least one table located at the state machine. In a default interrupt mode, the arbiter by default selects the highest priority currently flit occupied parallel input buffer for data transfer from the input processing unit to the output processing unit on a currently highest priority channel. In the meantime, superseding even higher priority flits may arrive at one or more of the parallel input buffers. While in the default interrupt mode the arbiter can interrupt the default selected currently highest priority channel when one of the parallel input buffers is detected to contain a superseding even higher priority flit to open a superseding even higher priority channel. In a preferred embodiment, when a sufficiently even higher priority flit detected in one of the parallel input buffers is of a priority sufficient to change modes (according to the set of instructions and the at least one table), the arbiter changes from the default interrupt mode to the transient switching mode to temporarily hold open a sufficiently even higher priority channel. The arbiter includes an interleave mechanism 1890 including an encoder to insert a cyclic redundancy code (CRC) into a sufficiently even higher priority EOP flit to hold the sufficiently even higher priority channel open in the transient switching mode until transfer of the superseding even higher priority EOP flit is complete. This allows transfer to operate on a temporary basis in a "wormhole" switching mode rather than a "store-and-forward" mode where a complete packet must be received before the CRC check can begin. This is important aspect of embodiments of this disclosure and provides a significant commercial advantage with regard to seamless control with very low latency especially at larger scale.

The computer network can include a protected host 1892 coupled to the interconnect fabric. The protected host can include an interconnect fabric manager 1894 that oversees an initialization process and maintains tables throughout the interconnect fabric that are responsible for dynamic routing of packets and control flits. The computer network can include an interconnect fabric manager server 1896 coupled to the interconnect fabric. The interconnect fabric manager server can include an interconnect fabric manager 1898 that oversees an initialization process and maintains tables throughout the interconnect fabric that are responsible for dynamic routing of packets and control flits.

Figure 19:
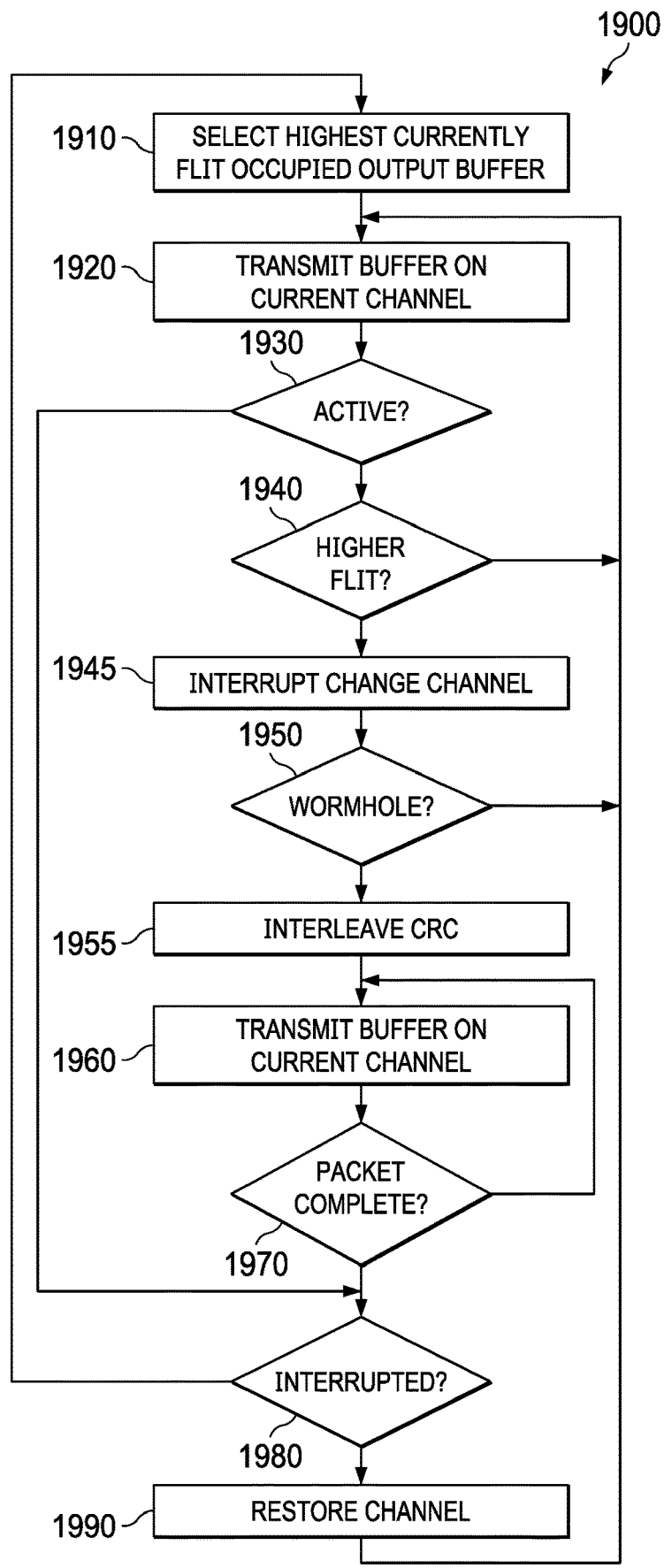
FIG. 19 is a flow diagram of a process that can be implemented by a computer program.

FIG. 19 illustrates a flow chart of a method 1900 of operating a computer network using a routing and control protocol based on a set of instructions and a plurality of tables. At step 1910 the highest priority currently flit occupied output buffer is selected to define a current channel. At step 1920 transfer begins flit by flit, packet by packet from a first in-line buffer of the current channel. At step 1930 a determination is made of whether the transfer is active. If the transfer is inactive, then the process proceeds to step 1980 (see below). If the transfer is active, then a determination is made at step 1940 of whether an even higher flit is present in one of the other output buffers. If there is an even higher flit present in one of the other output buffer, then an interrupt and channel change operation occurs at step 1945. At step 1950 a determination is made of whether the even higher flit (and its packet) will be granted transient wormhole switching mode to be transferred without interruption. If no, then the process proceeds to step 1920. If yes, then the process proceeds to step 1955. At step 1955, an interleave mechanism having an encoder inserts a cyclic redundancy code to define an EOP flit within an even higher priority packet to hold the even higher priority channel open on a higher layer in the transient wormhole switching mode until transfer of the even higher priority packet is complete. At step 1960, transfer begins flit by flit on the even higher priority channel. At step 1970 a determination is made of whether transfer of the packet is complete based on whether the cyclic redundancy code inserted flit has arrive. If no, then transfer continues at step 1960. If the cyclic redundancy code inserted EOP flit has arrived, then a determination is made at step 1980 of whether an interrupt occurred. If an interrupt did occur, then the previous channel is restored at step 1990 and the process proceeds to step 1920. If an interrupt did not occur, such as can happen when the process arrives at step 1980 from step 1930, then the process proceeds to step 1910.

The routing and control protocol behaves and functions as the "software" that controls and manages host-to-host transmissions in a routing and control fabric. The collection of host adaptors and routing and control data-distribution hardware devices comprising an interconnect fabric serves as a dedicated computer (network) that responds to these protocol commands, initiating state changes to guide packets and messages through the fabric as well as performing maintenance and control functions within the hardware modules. The functionality of this dedicated and distributed "fabric computer" or "intelligent network" can be to interpret and execute a set of 16 "instructions" that comprise the routing and control protocol. Of course, embodiments of this disclosure are not limited to a particular set of instructions and an embodiment of the disclosure may be based on a set that has fewer or more instructions.

FIG. 1 illustrates that the generic control flit 100 contains a 4-bit identifier 110 in bits 63:60 and carries parameters 120 in bits 59:8. Bits 7:0 130 are a reserved available for use by internal mechanisms and carry of ECC (error correcting code) codes for transport between devices. FIG. 1 shows the generic form of a control flit. The 16 different control types are specified by a control-flit identifier (CID) in bits 63:60 in the 64-bit flit. The parameter field in bits 59:8 carries information concerning specific actions or destinations within a device or fabric while bits 7:0 are reserved for use between devices and within the data-flow modules.

Table 1 shows the assigned CID (control-flit identifier) codes and the names for each of the control functions (instructions). The parameter field definitions are defined in the Fields column of the table. An Overview section below provides an overview of the parameter field, explaining the entries in the table. A Control Flit Details section below discusses each control flit in detail. A State-Machine Descriptions section below describes the state machines necessary to parse the control commands and carry out the specified functions.

TABLE 1

Control flits

| Bits<br>Name | 4<br>CID | 52<br>Fields | | | | | 8<br>ECC | Total: 64<br>Function |
|---|---|---|---|---|---|---|---|---|
| FCM | 0000 | Type[4] | pMap[16] | 0101 | Zeros[24] | 1010 | Zeros[8] | Flow control |
| PUT | 0001 | Pri[4] s g Type[4] | Destination[20] | Length[16] | Zeros[6] | | Zeros[8] | Write to memory/middle ware; two header flits |
| GET | 0010 | Pri[4] s g Type[4] | Destination[20] | Length[16] | Zeros[6] | | Zeros[8] | Read from memory/middle ware; three flits |
| sPUT | 0011 | Pri[4] s g Type[4] | Destination[11] | Offset[20] | Length[11] | | Zeros[8] | Write to memory/middle ware; one header flit |
| sGET | 0100 | Pri[4] s g Type[4] | Destination[11] | Offset[20] | Lenght[11] | | Zeros[8] | Read from memory/middle ware; two flits |
| EOP | 0101 | Tags[4] | Sequence[16] | | CRC-32 | | Zeros[8] | End of packet (write) |
| INIT | 0110 | Type[4] Atm[4] | MDM[16] | Parameters[28] | | | Zeros[8] | Initialize device tables |
| SUB | 0111 | Type[4] Atm[4] | MDM[16] | Parameters[28] | | | Zeros[8] | Group subscription managment |
| ACK | 1000 | Type[4] | pMap[16] | Length[16] | Zeros[16] | | Zeros[8] | Handshake between ports |
| CRC | 1001 | Length[16] | 0000 | | CRC-32 | | Zeros[8] | CRC code (embedded in long packets) |
| TOK | 1010 | Type[4] s g | Destination[20] | Parameters[26] | | | Zeros[8] | Token (used for coherent memory) |
| GEN | 1011 | Type[4] | Parameters[48] | | | | Zeros[8] | Generic control flit |
| EXT | 1100 | Type[4] | Parameters[48] | | | | Zeros[8] | External destination |
| TIME | 1101 | Time Stamp[52] | | | | | Zeros[8] | Time stamp (embedded in packet) |
| ERR | 1110 | Type[8] | Source ID[20] | Code[24] | | | Zeros[8] | Reporting errors to the manager |
| PHY | 1111 | Type[8] | Source ID[20] | Counter[24] | | | Zeros[8] | Hearbeat and transport functions |

Overview

Data movement in a routing and control fabric relies on two basic commands: the write or PUT and the read or GET. There are two versions of each as shown in Table 1. The remaining control flits defined in Table 1 are used to facilitate the flow of data in the fabric or to initialize and maintain the connection and subscription tables within the various fabric devices.

Each fabric device contains dedicated hardware in the form of state machines that are designed to interpret and execute the commands present in the various control flits. A network manager residing in a protected host or server oversees the initialization process (below) and maintains tables throughout the fabric that are responsible for dynamic routing of packets and control flits.

General Comments

Each control flit starts with a control identification field which can be followed by 4 to 10 bits that specify how the remaining fields are to be interpreted. Certain control flits are directed to destinations within the fabric while for others the destination can be implied. It can be the function of the above-mentioned state machines to examine these fields and direct traffic within each device from input to output as required.

Preamble field (Bits 66:64)

The Physical Layer Transmits Information as 67-Bit Words where Each Word has 3 preamble bits as the leading (high-order) part of the word. These preamble bits are defined as 3'b010 for control flits and 3'b101 for data flits. The preamble can be removed by a device's input circuitry or input processing unit (IPU) which splits the flit stream into a data stream and a control stream. Note that these two preamble fields are complements of each other which implies that a three-bit preamble can always be correctly identified in the presence of a single bit error. Confusion between control and data flits can only occur to second order or higher in the bit-error rate (BER).

CID Field (Bits 63:60)

The control-identification field can be in bits 63:60 for all control frames. The control flits responsible for data transfer (PUT, GET) each have a second part; the two parts are to be considered as atomic sets. The EOP flit terminates a PUT packet.

Priority Channels and Packet Interleaving

Hardware priority channels in both the fabric-interface devices (FIDs) and routing and control distribution devices (MDMs) can be implemented as a set of parallel FIFOs where each FIFO can be responsible for queueing flits of a particular priority. An interleave mechanism can be responsible for choosing the highest priority channel for transmission to a device's output port with the stipulation that a higher priority packet may interrupt one of lower priority any time the higher-priority FIFO contains flits.

Additional priority levels beyond the 16 allowed by a preferred embodiment of the protocol may be programmed at the user level without impacting the underlying hardware priorities. The only difference is that software priorities specify the order of release from the host and are non-interruptible except at the hardware level.

Data Transfer

The protocol supports both share- and distributed-memory models. The hardware structures in the receiving FID direct a packet to the particular memory or messaging destination depending on the type code in field 53:50. The MDM is only concerned with the priority in field 59:56, the s bit in location 55, the g bit in position 54, and the contents of the destination field.

The offset and length fields are used by the destination FID to set up DMA transfers into the receiving host's memory or to a middleware messaging area.

Supported Memory Models and Transfer Modes

The protocol supports multiple memory models according the interpretation of the PUT and GET parameter fields when the message headers reach the FID devices. There can be a specific type code for accessing shared memory where each host has a mirrored copy of an assigned memory segment and another type code for distributed memory where a large virtual memory space may be distributed throughout the host computers connected by the fabric.

The MDM state machines access the g bit and the destination field as described in the patent application "Priority-based arbitration for parallel multicast routing with self-directed data packets", Ser. No. 15/997,573, to direct a packet to appropriate exits. If the g bit is zero, the destination field specifies unicast or point-to-point transfer from the originating host to a particular designated host. A set g bit indicates a parallel or true multicast transfer where a message or packet can be sent simultaneously from the originating host to multiple endpoints.

The concept of a working group can be supported at the architectural level and operationally effected by a combination of the g bit and the subscription tables following system initialization. A working group is a technology of implementing parallel distributed processing in a multiprocessor environment where a single task may be distributed over multiple processors or multiple cooperating tasks may act in parallel. The protocol supports up to one million different groups that may be dynamically defined and active within the fabric.

The protocol also supports direct memory access where transfers are made from a host memory directly to the memory of one or more destination hosts as well as "messages" whose destination can be messaging middleware in the targeted hosts. These memory-transfer modes are available to the different memory models allowing, for example, members of a group to receive messages as well as direct memory-to-memory transfers.

Flit "grouping" by type and tag bits

Internally in the MDM, pathways out of the IPUs and through to the output processing units (OPUs), are 66 bits wide and carry two leading tag bits in addition to the 64-bit-wide flits. These tag bits are used to identify the type flit being carried through the MDM's FPGA. The ability to tag flits leaving the IPU enables a flit group of arbitrary length to be processed in the hardware or passed through to another fabric device.

If the transmission of a set of flits is atomic (may not be interrupted by any other transmission), the IPU tags each flit in a grouping according to its CID and type. A termination tag given to the last flit in an atomic group, as determined by an Atomic field in the first flit of the set, serves to close internal paths the same way that the EOP does for PUT packets.

If an atomic set of flits is meant for the processing MDM, it can be directed by the IPU or by the designated arbitration unit disclosed in U.S. application Ser. No. 15/997,573 to a management processing unit (MPU) for initialization or subscription purposes, otherwise the set can be sent to a designated control-flit FIFO for forwarding to the specified destination.

Flow Control

Host-FID Flow Control

PUT commands for packets to both shared and distributed memory are unconditional in the sense that packet data are guaranteed to be placed in the memory of the targeted host(s). The success of messaging PUT commands are contingent on there being adequate space in the targeted queue.

In the latter case, the PUT header acts as a request, which may be denied by the FID that keeps a register maintained by the host. The contents of this register indicate whether the designated message queue has room for the received message. The FID marks the received packet as failed so that it can be retransmitted in the usual manner. The retransmission continues as long as the destination slot is marked full. If the retransmission attempts exceed a certain threshold, an error may be generated and sent to the receiving host. In this way, handshaking for a specific write request is not needed.

MDM-FID Flow Control

Flow control between the FID and MDM is also integral to the routing and control design. A full FID input FIFO may initiate an FCM command to the attached MDM requesting the OPU to stop sending.

Error Correction

Every flit not categorized as a data flit by the preamble tag, can be sent to a Hamming decoder for error correction. These error-corrected control flits then are filtered according to CID and sent to the packet/message path to the FIFO of the specified priority or to the control-flit FIFO unless they are addressed to the receiving device. In the latter case, the specified control actions are carried out in the MDM or FID as noted above.

Packets or messages carrying data are terminated by an EOP command which carries a 32-bit parity or cyclic redundancy code (CRC) that can be verified in each transceiver as the packet traverses the fabric. If the CRC check fails, the packet can be retransmitted as described below.

Table Security

Connection and subscription tables essential to the fabric's operation are protected by a key-access method whereby any control flit attempting to alter these tables must carry a secure 56-bit access code.

Hardware State Machines

Commands for controlling the fabric and for communicating between fabric devices and endpoints are initiated in the hosts or servers at fabric leaves (nodes) or endpoints and interpreted by the FIDs (fabric interface devices) which then encode these commands as control flits or data flits and pass these flits to an attached MDM. The MDM, in turn, interprets the control flits as instructions for routing to MDM exits or for carrying out internal operations such as maintaining routing and subscription tables and reporting on device status.

Input Processing Unit

A state machine in the receiving device's IPU can be responsible for identifying control flits in the input stream and directing data packets or messages to the appropriate priority FIFO specified in the priority field. Control flits other that the data headers are directed to a FIFO reserved for control flits if they are meant for another device or are directed to internal state machines to carry out specified internal actions.

Arbitration

Arbitration units described in patent application Ser. No. 15/997,573 manage the flow of PUT and GET commands through the MDM and FID. Initialization commands are also treated in the arbitration units as described below.

Output Processing Unit

Each OPU has a hardware state machine for managing the priority interleave between the several output FIFOs that access a single exit port. Relevant information from control flits can be used to direct these commands to internal mechanisms or to the appropriate output FIFOs. That is, an OPU has no need to examine the contents of a control flit as it merely executes the priority interleave mechanize by releasing flits to its transmitting circuitry.

Control Flit Details

This Control Flit Details section describes the control flits in detail along with descriptions of the parameter fields and usage cases. The interpretation of these controls depends on the function of the receiving device as discussed above. The necessary actions are hard-coded into the state machines receiving and processing these commands. As in any computer, the code that runs on hardware must be designed to interpret the commands, so the following control descriptions must correspond to the underlying hardware.

FCM (CID 0000) Flow Control

FIG. 2 illustrates that an FCM flow-control flit 200 carries priority-channel information in the form of a bit map. FIG. 2 displays the fields in the 64-bit flow-control flit. The channel priority for FCM transport is always PO, the highest transmission priority. Bits 59:56 contain the type of the FCM while bits 57:40 refer to which priority channels are affected by the control flit. Any bits clear in the priority map will halt any transmission of the indicated priority while any bits set in the map will enable transmissions of the corresponding priority.

Type 0 or FCM[0] can be for transmission between devices generated when a receiving FIFO nears its capacity. An FCM[0] always travels on the high-priority PO channel since it must reach the transmitting device as soon as possible. This FCM[0] can be treated in the receiving device's IPU where it immediately halts transmission from the adjacent OPU on the priority channels indicated in the priority map.

Type 1 or FCM[1] can be reserved for credit-based flow control where the available credits are transmitted in bits 35:12 and the targeted priority channel can be transmitted in buts 55:40.

The bit patterns in fields 39:36 and 11:8 are present to ensure adequate transitions between high and low states in the transmitted serial pulse stream to avoid loss of synchronization in the receiving circuitry. Bit field 35:12 along with type codes greater than 0 are reserved for future system needs.

PUT (CID 0001) Write to Memory/Middle Ware; Two Header Flits

FIG. 3 illustrates a PUT flit. FIG. 3 shows the header atomic pair including a first flit 300 and a second flit 350 for a write request that addresses up to $2^{20}$ point destinations or multicast groups and up to $2^{52}$ bytes of memory.

The 4-bit integer specifying the priority channel can be used to open a channel from the IPU to the FIFO of the corresponding priority. The s bit in position 55 indicates that a multicast transmission is to leave all specified exits simultaneously as mediated by status information from the targeted output FIFOs. The g bit in position 54 indicates a multicast transmission and that the subscription table is to be accessed in internal arbitration circuitry detailed in U.S. application Ser. No. 15/997,573.

There are 16 possible type codes to distinguish between messages and memory-to-memory transfers, shared or distributed memory models, and to indicate coherent messages as described in U.S. application Ser. No. 15/262,402, among other possibilities. Specific codes and meanings must be coordinated with appropriate state machines in the receiving devices.

GET (CID 0010) Read from Memory/Middle Ware; Three Flits

FIG. 4 illustrates a GET flit. FIG. 4 shows the atomic triplet structure of the GET command that can be addressed to a specific endpoint device and requests that a PUT packet be generated containing the contents of the remote memory specified by the destination and length fields. The atomic triplet structure includes a first flit 430, a second flit 460 and a third flit 490. If the g bit is set, the group ID in the second flit of the atomic triplet is used to access the group shared memory in the specified device at the offset specified in the third flit. In this case, the data read at the offset can be broadcast to all members of the specified group to establish memory consistency across the group.

If the g bit is clear, the data at the designated location are returned to the initiating host at the specified address. The type code can be used to distinguish between different modes of transfer (e.g. memory-to-memory or messaging) with the "other parameters" field being interpreted in the receiving FID according to type. The offset field in the third flit of the set specifies the offset into the memory of the destination device.

Short PUT (CID 0011) Write to Memory/Middle Ware; One Header Flit

FIG. 5 shows a single-flit PUT header 500 designed for high-performance, tight clusters of up to 1024 endpoints. FIG. 5 illustrates the header introducing a message of 4096 bytes maximum length and, due to the single-flit header size, can be reserved for smaller clusters when high performance is paramount.

The length of 12 bytes can be chosen to correspond with the maximum length covered by a single 32-bit CRC that has a Hamming diameter of 6. To maintain the Hamming diameter, longer messages must be broken up into several transmissions unless the state machine is programmed to insert CRC flits within the packet as described below. As above, the different transfer modes and memory models are distinguished by the type field.

Short GET (CID 0100) Read from Memory/Middle Ware; Two Flits

FIG. 6 illustrates the GET command corresponding to the short PUT command. The atomic pair includes a first flit 600 and a second flit 650. FIG. 6 shows the structure of the short GET command paired with the short PUT command discussed above. Its function can be parallel to that of the GET command with CID 0010.

EOP (FID 0101) End-of-Packet (Write)

FIG. 7 illustrates that an EOP tail flit 700 terminates a write packet by closing open paths from an IPU to the active priority FIFO and resets the targeted arbitration unit to its quiescence state. FIG. 7 defines the end-of-packet (EOP) control flit that can be required for write packets with a PUT or sPUT header. The four type bits indicate the type of packet termination. One of the bits can be reserved for packet or message cancellation that, when set, indicates cancellation due to a transmission error detected by a CRC-32 parity check. The remaining three bits in the type field may be used for other purposes as long as they are properly decoded by the IPU hardware monitoring the input stream.

The sequence field in bits 55:40 may be used for packet sequence numbers in accordance with a sequence bit being set in the type field. Such sequence numbers may be required for certain network operations.

The CRC-32 field contains a cyclic-redundancy code computed over the data portion transmitted between the PUT header pair and the EOP. The CRC-32 check must be carried out sequentially, on a flit-by-flit or bit-by-bit basis, with the PUT initializing the check and the EOP terminating the check. This requirement allows packet transfer to operate in a "wormhole" mode rather than the "store-and-forward" mode where a complete packet must be received before the CRC check can begin.

The suggested Koopman polynomial 0x90022004 ($x^{32}$+ $x^{29}$+$x^{18}$+$x^{14}$+$x^{3}$+1) achieves a minimum Hamming distance of 6 over the packet size from 8 to 32768 bits (⅛ to 512 flits). From the expansion shown, it has 5 coefficients.

Other interpretations of the four type bits are possible and will determine the particular structure and function of the hardware state machines responsible for responding to the EOP. However, in preferred embodiments the cancellation bit in position 59 is essential for correct operation of the fabric in the presence of transmission noise and must be present.

INIT (CID 0110) Initialize Device Tables

FIG. 8 illustrates that the INIT control flit contains a 4-bit type code, a 4-bit atomic set length, a 16-bit address, and a 28-bit parameter field interpreted according to the type code. In this embodiment, there is a first flit 800 and a second flit 850. FIG. 8 shows the form of the INIT command that can be used to initialize each device in a fabric.

The initialization process can be programmed into the hardware state machines with states defined to carry out each of the INIT instructions according to type and destination. In the preferred process, a secure network manager is responsible for initializing a fabric once all devices have been connected. This manager is cognizant of the fabric topology and the (presumed) location of all network devices. Initialization begins by sending out an INIT command to the manager's FID which is relayed to the connected MDM. This first command carries information concerning the set of connections between that first MDM and all MDM's that are attached to it. The manager then keeps sending out INIT commands with connectivity information addressed to each MDM in the expanding chain of connections.

An INIT command that fails due to a missing device or reaching in unexpected device generates an ERR notification that can be sent back to the network manager. In this way, the validity of the physical connections can be checked against those expected from the predefined network topology.

Once the connectivity table in each MDM is initialized, the network manager starts sending out initialization information to each of the FIDs attached to the MDMs. This information is then followed by a group-subscription information. Typically, there are 12 different types of INIT commands need to fully initialize all devices, tables, and connections within a fabric.

An entire large fabric can be initialized as well as re-initialized in a short time since these commands have high priority (implied by the CID field) and are typically issued prior to the fabric carrying other traffic.

SUB (CID 0111) Group Subscription Management

FIG. 9 illustrates that the SUB or group subscription complex can be identified by a type code. FIG. 9 shows the structure of the basic SUB command which can be used to maintain group subscriptions. In this embodiment there is a first flit 900 and a second flit 950. The type code specifies whether the command is a request from an arbitrary host to join or leave a group, a request to read a group's subscription information, or a response from the network manager to such a request. All SUB commands that access a group table anywhere in the fabric require a key code. If the key code is absent or incorrect code, the command is ignored and an error condition is noted.

Each SUB command can be an atomic group whose length can be specified by the Atm field. For example, additional flits are required to carry the exit map for a particular group to each MDM conveying traffic to that group.

ACK (CID 1000) Handshake Between Ports

FIG. 10 illustrates that an ACK control flit 1000 can be used to handshake across transceiver lanes between two devices. The command carries a type code, a priority map, and a length specifying the length in flits in the transmitting device. FIG. 10 shows the structure of the handshaking ACK control flit that can be used to acknowledge correct transmission of packets and messages between two devices.

A state machine in the receiving IPU performs a CRC check on the incoming data flits as described above. When the EOP or CRC flit is detected, the check is complete and the result can be compared to the value carried by the CRC field in the terminating flit. If the transmission is valid (no bit errors detected) an ACK[0] is sent out by the associated OPU to the transmitter's IPU. The priority map in the returned ACK contains a bit set corresponding to the priority channel of the transmitted data and the length field contains the number of data flits observed during the CRC check. The receiving IPU decodes the ACK and advances the pointer of the transmitting FIFO specified by the priority map by the specified length.

If an error is detected, an ACK[1] communicates the same information to the sender. The receiving IPU decodes the ACK and sets the transmit pointer of the transmitting FIFO specified by the priority map to the beginning of the stored data pointed to by the contents of the reset length.

CRC (CID 1001) CRC Code (Embedded in Long Packets)

FIG. 11 illustrates that a CRC control flit 1100 may be inserted anywhere within a sequence of data packets to provide error detection for the set of preceding data flits. FIG. 11 displays the structure of the CRC control flit. This flit can be placed within a sequence of data packets whenever the OPU of the transmitting device deems it appropriate.

The CRC flit carries a length representing the number of data flits covered by the value in the CRC field and the CRC checksum of that data. An arbitrarily long data packet may be transmitted from a source memory to one or more destination memories in a safe and err-free manner by inserting a CRC flit at appropriate places in the data stream.

TOK (CID 1010) Token (Used for Coherent Memory)

FIG. 12 illustrates a TOK flit 1200 that transmits information to the receiving host for purposes of synchronization and implementing semaphores as required by the user. FIG. 12 suggests the form of a token control flit that may travel with a data packet or be sent as a standalone command to a particular endpoint or working group. The fabric hardware need only decode the destination according to the g bit. The destination device can be programmed to deal with specifics as required by the user. A set s bit ensures that a group token can be released to all specified bits simultaneously.

GEN (CID 1011) Generic

FIG. 13 illustrates that a GEN flit 1300 allows other information to travel with a message packet, as a source address for example, or as an independent control flit. The generic (GEN) control flit is a "catch all" container that allows for unforeseen additional needs. There are 16 possible types and a field of 48 bits allowing for arbitrarily defined parameters. If MDM actions are requested, the necessary circuitry must be present in the MDM. Similarly, if an HBA action is requested, the appropriate circuitry must be present in the HBA.

EXT(CID 1100) Address and Offset Extension

FIG. 14 illustrates an EXT flit 1400 that allows for extending the destination and offset fields to arbitrarily large fabrics. FIG. 14 is a generic form of the extension control flit that extends addressing capabilities from a localized fabric of 65536 MDMs and one million endpoints or groups to a world-wide fabric limited in size only by the memory space available for subscription and connectivity tables in the devices comprising the fabric.

This flit may immediately follow a flit that contains addressing or offset information. Mechanisms for interpreting parameters carried by EXT must be built into the hardware devices to be effective, otherwise EXT can be ignored.

TIME (CID 1101) Time Stamp

FIG. 15 shows that a TIME flit 1500 transmits a time stamp from source to destination. FIG. 15 illustrates a time stamp that may be inserted into a data packet or message. It is decoded at packet's destination and may be used to coordinate network traffic as well as provide temporal information to the receiver.

ERR (CID 1110) Reporting Errors to the Manager

FIG. 16 illustrates that an ERR flit 1600 transmits errors from the originating source noted in the Source field are sent to a central network manager. There are 24 bits reserved for error codes or other items. FIG. 16 shows the form of the error-reporting control flit. This flit may be generated in a hardware module to report on internal error conditions. The destination is always to the network manager whose position in the fabric is set at system initialization in each fabric device.

PHY (CID 1111) Heartbeat and Transport Functions

FIG. 17 illustrates that a PHY flit 1700 or null flit can be a control flit transmitted when no data or other control flits are transmitted. It may also be used to verify devices according to the contents of the type and parameter fields. FIG. 17 shows the form of the heartbeat flit that can be sent if no other information is ready to be transmitted by an OPU. The 8-bit type field may be split into a type and a device code to identify the source of the transmission.

Heartbeats or null flits are generally ignored by the receiving device. However, the form suggested here allows for a wider range of actions that may be built into the transmitting and receiving hardware.

State-Machine Descriptions

The following discussion presents the action of the state machines realized in hardware that parse the various control flits and direct flit traffic according to the implied functionality. The contents of the flits themselves imply their own functionality.

Input Processing Unit (IPU)

A serial pulse stream, typically but not necessarily carried on optical fibers, can be sent to and from bidirectional transceiver ports that communicate between fabric devices. The receiving circuitry of a transceiver converts the serial pulse stream into words carried on 66-bit-wide buses. When a control flit is identified by its preamble, the flit is sent to a Hamming decoder that corrects single-bit errors. The CID is then examined. If the control flit is a message or packet header (PUT, sPUT, GET, or sGET), a tag 2'b01 is prepended to the 64 information bits. The priority value can be extracted and the flit and subsequent members of an atomic group are sent along a path to a FIFO of the specified priority. Following words in the parallel stream that are identified as data follow the header along the opened path and are queued in the selected FIFO.

A control flit identified as EXT, CRC, TOK, or TIME follows the same path as the data since these flits are designed to travel within a message or packet. A control flit not so identified can be sent directly to the PO or high-priority FIFO to be sent to the specified device, or, if it is identified as addressed to the receiving device, it and members of its atomic group are sent to the relevant state machine for carrying out actions within the device itself.

The EOP can be a special case in that it follows the header and can be queued in the FIFO. At that time, the path to the receiving FIFO is closed so that a subsequent flit in that stream must be a control flit that opens a new path to a FIFO or an internal control processor. This condition can be enforced by the OPU in the transmitting device.

The GET or sGET commands do not carry data but are commands that require their own priority FIFOs to prevent deadlock at the receiving FID in case the response to the GET requests does not keep up with incoming GET requests. This can be a matter for flow control, but its solution requires separate priority channels. In a preferred embodiment, the GET control flit is always followed by at least two untyped control flits as shown above in sub-section GET (CID 0010) and sub-section Short GET (CID 0100). That is, they indicate atomic groups with a predetermined number of members. The final flit in the group can be tagged with 2'b11 to indicate an end of group while other members of the group have the tag 2'b00 as they carry parameters. There is no CRC associated with atomic groups as each flit in a group is processed by a Hamming decoder. This tagging convention applies to other atomic groups such as INIT and SUB as well.

A TOK control flit appearing before a path is opened or between atomic groups is treated as a stand-alone control flit not belonging to a message packet and therefore carries a destination as well as other parameters. As such, it is forwarded to the destination host for semaphoring or other actions as specified by the parameters.

Arbitration Processing Unit (APU)

U.S. application Ser. No. 15/997,573, filed Jun. 4, 2018, the entire contents of which are hereby expressly incorporated herein by reference for all purposes, contains a complete description of the arbitration process involving parsing a header and establishing paths to the output FIFOs specified by the g bit and destination fields as described above in the sub-sections PUT (CID 0001), GET (CID 0010), Short PUT (CID 0011), Short GET (CID 0100), and EOP (FID 01010). That disclosure referred to certain tables residing in each arbitration unit but left the construction and maintenance of these tables unspecified. It is the purpose of the INIT and SUB commands discussed above to initialize and maintain these tables by initialization- and subscription-processing state machines that reside in each arbiter.

As mentioned above, a fabric manager residing on one of the host devices computes all connections and assigns device indices by building a connection table describing the fabric topology using the given number of MDMs and FIDs. There is a specific and known algorithm for each of several regular network topologies used in large fabrics.

The steps directed by the INIT commands and carried out in the relevant state machines during the initialization process for a fabric are summarized below.

INIT[0]: All APUs receive a copy that is read into the target configuration tables.

INIT[1]: Only APU[0] receives the command and the exit carried by the command is written in the table to connect the receiving MDM to the MDM specified in the command. Each MDM must receive an INIT[1] command for all other MDMs in the fabric.

INIT[2]: All APUs except APU[0] receive copies. The exit carried by the command is written into each receiving APU in the table row specified by the FID index, also carried by the command. Each MDM must receive an INIT[2] command for each FID in the fabric.

INIT[3]: Only APU[0] receives the command which is forwarded to the specified exit as an INIT[4].

INIT[4]: Receiving IPU processes and writes its table and sends an updated command back as INIT[5].

INIT[5]: Receiving IPU processes and writes its table with information sent back by the transmitting OPU.

Initialization for a newly configured fabric or following a system reset must be carried out by a secure process in a secure host. Once an MDM has been initialized by the set of INIT[0] and INIT[1] commands, it is able to pass these commands on to the specified target MDM. The final act in table initialization is to overwrite the zero key code in the table with the key code supplied in the INIT[0] command. These codes are typically contained in the last two flits of the atomic group. Once these keys are in place, only INIT or SUB commands that carry the matching code may alter or read table contents.

A state machine in each APU also handles group subscriptions by writing a new or updated exit map carried by the SUB command into the row specified by the group ID carried by the command. The process requires parsing the SUB command which can be sent to a specific host by the network manager along with an access key and one or more flits containing a bit map of the updated group exits. Since an untyped flit may carry only 56 bits, a subscription map for each defined group for an MDM with 256 exit ports, for example, will require a maximum of 5 flits for the exit map. A fabric may require a SUB command sent to each MDM connected to the fabric to change the membership of a particular group. Since these commands travel at the highest priority, a complete update should take place fairly rapidly. Note that multicast traffic sent to non-existent groups or missing group members does not occur since exit information in the exit tables will be absent.

Output Processing Unit (OPU)

Since an OPU passes flit traffic according to priority, no state machines are required for parsing control flits.

Control-Flit Processing in the Terminal Devices

Each FID can be a terminal device in the fabric since messages and packets sent to a host or hosts are received by the corresponding FID. An FID has an IPU for receiving flits from the attached MDM and an OPU for sending out information formatted as flits to the attached MDM. The mechanisms for communicating with the host device are not discussed in this document.

The IPU in an FID has an equivalent form, function, and state machines to those in the MDM in that it opens a path to the specified priority FIFO and handles certain FCM control flits in as described above. ERR, TIME, and TOK flits are formatted and passed to the attached host. GET commands initiate direct-memory access reads from host memory which are then formatted as PUT commands as queued in the specified output FIFO for transmission. PUT headers are decoded by interpreting the transmitted g bit, destination field, and offset to open a channel to the receiving host's memory or messaging area. The information needed to direct the data carried by a PUT can be obtained from tables in the FID that contain offsets into memory or relative addresses of the supported messaging areas.

The OPU also functions in a similar manner as described in that it receives flits prepared by state machines in response to commands from the host.

Definitions

A flit (flow control unit or flow control digit) is intended to mean a link-level atomic piece that forms part of a network packet, page or stream. A non-transitory computer readable media is intended to mean stored computer-readable or machine-readable program elements translatable for implementing a method of this disclosure. The terms program and software and/or the phrases program elements, computer program and computer software are intended to mean a sequence of instructions designed for execution on a computer system (e.g., a program and/or computer program, may include a subroutine, a function, a procedure, an object method, an object implementation, an executable application, an applet, a servlet, a source code, an object code, a shared library/dynamic load library and/or other sequence of instructions designed for execution on a computer or computer system).

The term uniformly is intended to mean unvarying or deviating very little from a given and/or expected value (e.g. within 10% of). The term substantially is intended to mean largely but not necessarily wholly that which is specified. The term approximately is intended to mean at least close to a given value (e.g. within 10% of). The term generally is intended to mean at least approaching a given state. The term coupled is intended to mean connected, although not necessarily directly, and not necessarily mechanically. The term proximate, as used herein, is intended to mean close, near adjacent and/or coincident; and includes spatial situations where specified functions and/or results (if any) can be carried out and/or achieved. The term distal, as used herein, is intended to mean far, away, spaced apart from and/or non-coincident, and includes spatial situation where specified functions and/or results (if any) can be carried out and/or achieved. The term deploying is intended to mean designing, building, shipping, installing and/or operating.

The terms first or one, and the phrases at least a first or at least one, are intended to mean the singular or the plural unless it is clear from the intrinsic text of this document that it is meant otherwise. The terms second or another, and the phrases at least a second or at least another, are intended to mean the singular or the plural unless it is clear from the intrinsic text of this document that it is meant otherwise. Unless expressly stated to the contrary in the intrinsic text of this document, the term or is intended to mean an inclusive or and not an exclusive or. Specifically, a condition A or B is satisfied by any one of the following: A is true (or present) and B is false (or not present), A is false (or not present) and B is true (or present), and both A and B are true (or present). The terms a and/or an are employed for grammatical style and merely for convenience.

The term plurality is intended to mean two or more than two. The term any is intended to mean all applicable members of a set or at least a subset of all applicable members of the set. The term means, when followed by the term "for" is intended to mean hardware, firmware and/or software for achieving a result. The term step, when followed by the term "for" is intended to mean a (sub)method, (sub)process and/or (sub)routine for achieving the recited result. Unless otherwise defined, all technical and scientific terms used herein have the same meaning as commonly understood by one of ordinary skill in the art to which this present disclosure belongs. In case of conflict, the present specification, including definitions, will control.

The described embodiments and examples are illustrative only and not intended to be limiting. Although embodiments of the present disclosure can be implemented separately, embodiments of the present disclosure may be integrated into the system(s) with which they are associated. All the embodiments of the present disclosure disclosed herein can be made and used without undue experimentation in light of the disclosure. Embodiments of the present disclosure are not limited by theoretical statements (if any) recited herein. The individual steps of embodiments of the present disclosure need not be performed in the disclosed manner, or combined in the disclosed sequences, but may be performed in any and all manner and/or combined in any and all sequences. The individual components of embodiments of the present disclosure need not be formed in the disclosed shapes, or combined in the disclosed configurations, but could be provided in any and all shapes, and/or combined in any and all configurations. The individual components need not be fabricated from the disclosed materials, but could be fabricated from any and all suitable materials. Homologous replacements may be substituted for the substances described herein. Agents which are both chemically and physiologically related may be substituted for the agents described herein where the same or similar results would be achieved.

Various substitutions, modifications, additions and/or rearrangements of the features of embodiments of the present disclosure may be made without deviating from the scope of the underlying inventive concept. All the disclosed elements and features of each disclosed embodiment can be combined with, or substituted for, the disclosed elements and features of every other disclosed embodiment except where such elements or features are mutually exclusive. The scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" or "mechanism for" or "step for". Sub-generic embodiments of this disclosure are delineated by the appended independent claims and their equivalents. Specific embodiments of this disclosure are differentiated by the appended dependent claims and their equivalents.

The invention claimed is:

1. A computer network, comprising:
    an interconnect fabric including a plurality of routing and control distribution devices, and
    a plurality of fabric interface devices coupled to the plurality of routing and control distribution devices;
    wherein each of the plurality of routing and control distribution devices and each of the plurality of fabric interface devices further comprises a state machine further comprising:
        a plurality of bidirectional transceiver ports, each bidirectional transceiver port of the plurality of bidirectional transceiver ports having receiving circuitry and transmitting circuitry;
        an input processing unit coupled to the plurality of bidirectional transceiver ports; the input processing unit further comprising a plurality of parallel input buffers coupled to the plurality of bidirectional transceiver ports; wherein each parallel input buffer of a plurality of parallel input buffers queues flits of one of a plurality of priority channels;
        an output processing unit coupled to the plurality of bidirectional transceiver ports; the output processing unit further comprising a plurality of parallel output buffers coupled to the plurality of bidirectional transceiver ports; wherein each parallel output buffer of the plurality of parallel output buffers, queues flits of one of the plurality of priority channels;
        an arbiter coupled to the input processing unit and coupled to the output processing unit; wherein the arbiter transfers data from the input processing unit to the output processing unit based on a set of instructions and at least one table located at the state machine;
        wherein the arbiter in a default interrupt mode chooses a highest priority currently flit occupied parallel input buffer for data transmission from the input processing unit to the output processing unit on a highest priority currently flit occupied channel; and
        wherein the arbiter interrupts the highest priority currently flit occupied channel when one of the plurality of parallel input buffers is detected to contain a superseding even higher priority;
        wherein the arbiter further comprises an interleave mechanism further comprising an encoder;
        wherein when one of the plurality of parallel input buffers is detected to contain a sufficiently even higher priority flit that according to a set of instructions and at least one table located at the state machine is sufficient to change modes, the arbiter changes from the default interrupt mode to a transient switching mode to temporarily hold open a sufficiently even higher priority channel before automatically returning to the default interrupt mode; and wherein the encoder inserts a cyclic redundancy code into a sufficiently even higher priority EOP flit to hold the sufficiently even higher priority channel open in the transient switching mode until transfer of the sufficiently even higher priority EOP flit is complete.

2. The computer network of claim 1, further comprising a protected host coupled to the interconnect fabric, the protected host or server having an interconnect fabric manager that oversees an initialization process and maintains tables throughout the interconnect fabric that are responsible for dynamic routing of packets and control flits.

3. The computer network of claim 1, further comprising an interconnect fabric manager server coupled to the interconnect fabric, the interconnect fabric manager server having an interconnect fabric manager that oversees an initialization process and maintains tables throughout the interconnect fabric that are responsible for dynamic routing of packets and control flits.

4. The computer network of claim 1, wherein each of the plurality of parallel input buffers further comprises a first in first out buffer.

5. The computer network of claim 1, wherein each of the plurality of parallel output buffers further comprises a first in first out buffer.

6. A method, comprising:
operating a computer network using a routing and control protocol, the computer network having an interconnect fabric including a plurality of routing and control distribution devices and a plurality of fabric interface devices coupled to the plurality of routing and control distribution devices, each of the plurality of routing and control distribution devices and each of the plurality of fabric interface devices having a state machine having an input processing unit having a plurality of parallel input buffers, an output processing unit having a plurality of parallel output buffers and an arbiter;
operating the state machine based on a set of instructions and at least one table located at the state machine;
transferring data from the input processing unit to the output processing unit using the arbiter based on the set of instructions and at least one table;
choosing a highest priority currently flit occupied parallel input buffer under a default interrupt mode located in the input processing unit for data transmission from the input processing unit to the output processing unit on a highest priority currently flit occupied channel using the arbiter;
interrupting the highest priority currently flit occupied channel when one of the plurality of parallel input buffers is detected to contain a superseding even higher priority flit using the arbiter; and
changing from the default interrupt mode to a transient switching mode at the state machine when one of the plurality of parallel input buffers is detected to contain a sufficiently even higher priority flit that according to the set of instructions and at least one table located at the state machine is sufficient to change modes to temporarily hold open a sufficiently even higher priority channel before automatically returning to the default interrupt mode.

7. The method of claim 6, further comprising inserting a cyclic redundancy code into a sufficiently even higher priority EOP flit using an interleave mechanism located at the arbiter to hold the sufficiently even higher priority channel open in the transient switching mode until transfer of the sufficiently even higher priority EOP flit is complete.

8. A non-transitory computer readable media comprising executable programming instructions for performing the method of claim 6.

* * * * *